(12) United States Patent
Vegh et al.

(10) Patent No.: US 11,153,309 B2
(45) Date of Patent: Oct. 19, 2021

(54) MULTIFACTOR AUTHENTICATION FOR INTERNET-OF-THINGS DEVICES

(71) Applicants: AT&T Mobility II LLC, Atlanta, GA (US); AT&T Intellectual Property II, L.P., Atlanta, GA (US)

(72) Inventors: Russell Vegh, Atlanta, GA (US); Senthil Ramakrishnan, Atlanta, GA (US); Roger Mahler, Marietta, GA (US)

(73) Assignees: AT&T Mobility II LLC, Atlanta, GA (US); AT&T Intellectual Property II, L.P., Atlanta, GA (US)

( * ) Notice: Subject to any disclaimer, the term of this patent is extended or adjusted under 35 U.S.C. 154(b) by 544 days.

(21) Appl. No.: 15/919,638

(22) Filed: Mar. 13, 2018

(65) Prior Publication Data

US 2019/0289002 A1 Sep. 19, 2019

(51) Int. Cl.
H04L 29/06 (2006.01)

(52) U.S. Cl.
CPC ...... H04L 63/0876 (2013.01); H04L 63/0823 (2013.01); H04L 63/10 (2013.01); H04L 2463/082 (2013.01)

(58) Field of Classification Search
CPC . H04L 63/0876; H04L 63/0823; H04L 63/10; H04L 63/082
See application file for complete search history.

(56) References Cited

U.S. PATENT DOCUMENTS

| | | | |
|---|---|---|---|
| 6,516,316 B1 * | 2/2003 | Ramasubramani | ..... H04L 29/06 |
| 8,503,657 B2 | 8/2013 | Tyagi et al. | |
| 9,179,241 B2 | 11/2015 | Hu et al. | |
| 9,426,222 B2 | 8/2016 | Wang et al. | |
| 9,426,601 B2 | 8/2016 | Hu et al. | |
| 9,497,070 B2 | 11/2016 | Mungo et al. | |
| 9,603,019 B1 | 3/2017 | Ramatchandirane et al. | |
| 9,641,553 B2 | 5/2017 | Ellis et al. | |
| 9,712,491 B2 | 7/2017 | Burns et al. | |

(Continued)

FOREIGN PATENT DOCUMENTS

| | | |
|---|---|---|
| CN | 102111910 CN | 6/2011 |
| DE | 102015211104 DE | 12/2016 |

(Continued)

OTHER PUBLICATIONS

RenéHummen et al., Towards Viable Certificate-based Authentication for the Internet of Things, Apr. 2013, ACM, p. 37-42. (Year: 2013).*

(Continued)

*Primary Examiner* — Luu T Pham
*Assistant Examiner* — Fahimeh Mohammadi
(74) *Attorney, Agent, or Firm* — Hartman & Citrin LLC

(57) ABSTRACT

Concepts and technologies are disclosed herein for multifactor authentication for Internet-of-things devices. An access request can be received from an Internet-of-things device. The access request can include identifying information associated with the Internet-of-things device and a certificate. The certificate can be validated and a stored version of the identifying information can be obtained. If the stored version of the identifying information is determined to match the identifying information included with the access request, access to a resource can be allowed.

20 Claims, 8 Drawing Sheets

(56) References Cited

U.S. PATENT DOCUMENTS

| | | | |
|---|---|---|---|
| 9,779,571 B2 | 10/2017 | Chong | |
| 9,781,213 B2 | 10/2017 | Mungo et al. | |
| 9,832,019 B2 | 11/2017 | Choi | |
| 9,858,597 B2 | 1/2018 | DeWitt et al. | |
| 9,866,637 B2 | 1/2018 | Doraiswamy et al. | |
| 9,888,000 B2 | 2/2018 | Seibert, Jr. et al. | |
| 10,291,477 B1* | 5/2019 | Askar | H04W 4/50 |
| 10,425,242 B2* | 9/2019 | Berdy | H04L 63/0428 |
| 2002/0166049 A1* | 11/2002 | Sinn | H04L 67/306 |
| | | | 713/175 |
| 2002/0184217 A1* | 12/2002 | Bisbee | H04L 63/123 |
| 2002/0194584 A1* | 12/2002 | Suorsa | G06F 8/60 |
| | | | 717/176 |
| 2008/0086634 A1* | 4/2008 | Salowey | H04L 9/3268 |
| | | | 713/156 |
| 2008/0108321 A1* | 5/2008 | Taaghol | H04W 12/35 |
| | | | 455/410 |
| 2008/0130623 A1* | 6/2008 | Skog | H04L 29/12896 |
| | | | 370/349 |
| 2010/0122326 A1* | 5/2010 | Bisbee | H04L 63/083 |
| | | | 726/5 |
| 2013/0054829 A1* | 2/2013 | Mathews | H04L 12/4625 |
| | | | 709/238 |
| 2014/0123124 A1* | 5/2014 | Gray | G06F 8/654 |
| | | | 717/170 |
| 2014/0181506 A1* | 6/2014 | Resch | H04L 63/0823 |
| | | | 713/156 |
| 2015/0121470 A1* | 4/2015 | Rongo | H04L 12/2807 |
| | | | 726/4 |
| 2015/0264512 A1 | 9/2015 | Jain et al. | |
| 2016/0205078 A1* | 7/2016 | James | H04L 9/006 |
| | | | 713/171 |
| 2016/0315779 A1 | 10/2016 | Chan et al. | |
| 2017/0064550 A1 | 3/2017 | Sundaresan et al. | |
| 2017/0099148 A1* | 4/2017 | Ochmanski | H04L 9/3247 |
| 2017/0272945 A1 | 9/2017 | Link, II | |
| 2017/0279620 A1* | 9/2017 | Kravitz | H04L 9/3268 |
| 2017/0280315 A1 | 9/2017 | Dravneek et al. | |
| 2017/0331801 A1 | 11/2017 | Mezei et al. | |
| 2017/0353462 A1 | 12/2017 | Siwal et al. | |

FOREIGN PATENT DOCUMENTS

| | | |
|---|---|---|
| KR | 20160121775 KR | 10/2016 |
| WO | WO 2016155112 | 10/2016 |
| WO | WO 2017168228 | 10/2017 |
| WO | WO 2018008983 | 1/2018 |

OTHER PUBLICATIONS

Lukas Reinfurt et al., Internet of Things Patterns for Device Bootstrapping and Registration, Jul. 2017, ACM, pp. 1-27. (Year: 2017).*

Pablo Punal Pereira et al., An Authentication and Access Control Framework for CoAP-based Internet of Things, Oct. 29-Nov. 1, 2014, IEEE, pp. 5293-5299. (Year: 2014).*

Vangelis Gazis, A Survey of Standards for Machine-to-Machine and the Internet of Things, Jul. 19, 2016, IEEE, vol. 19, Issue: 1, pp. 482-511. (Year: 2016).*

Noack, Martin, "Optimization of Two-way Authentication Protocol in Internet of Things," Master Thesis, Communication Systems Group, University of Zurich, Department of Informatics, Aug. 21, 2014.

Waters, Michael, "Evaluating Identity and Access Management (IAM) as a Cloud Service," MSIT 5243—Practicum, Lipscomb University, Sep. 2016.

Yang et al., "Design and Application of NFC-Based Identity and Access Management in Cloud Services," World Academy of Science, Engineering and Technology International Journal of Computer and Information Engineering, vol. 11, No. 4, Apr. 2017, pp. 420-428.

Hardy, Nazli W., "The Internet of Things Ecosystem: Survey of the Current Landscape, Identity Relationship Management, Multifactor Authentication Mechanisms, and Underlying Protocols," World Academy of Science, Engineering and Technology International journal of Computer, Electrical, Automation, Control and Information Engineering, vol. 10, No. 6, Jun. 2016, pp. 1202-1206.

Jha et al., "Security consideration for Internet of Things," Whitepaper, L&T Technology Services, 2014, retrieved at http://203.199.60.24/media/30090/whitepaper_security-considerations-for-internet-of-things.pdf on Feb. 9, 2018.

* cited by examiner

MULTIFACTOR AUTHENTICATION FOR INTERNET-OF-THINGS DEVICES

BACKGROUND

The Internet-of-things ("IoT") is a phrase used to refer to physical objects and/or systems of physical objects that can be provided with network connectivity for various purposes. Various IoT devices can access the Internet, other networks, and/or other devices for various purposes and/or operations including, but not limited, ordering goods and services; obtaining news, traffic, and/or weather information; updating data at remote data sources; executing applications hosted by remote devices; or the like. Some of these purposes may benefit from authentication to ensure a request and/or operation is authorized.

Each IoT device, however, may have a specialized, unique, and/or dedicated security solution to enable authentication. For example, an IoT device may access an associated security platform to process a security transaction. The associated security platform can have its own dedicated security policies, protocols, and the like; and may be updated by a user when the IoT device is activated. Thus, the IoT device may be able to authenticate with a third party platform, but such access may be expensive, difficult to deploy, and may increase the time to market and/or time to activate the device by a user or other entity.

These and other complications can be more pronounced if multiple authentication methods and/or approaches are desired for an IoT device. Programming and/or enabling multiple authentication steps and/or multiple involved entities in an authentication scheme may further complicate the enabling of the IoT device and/or the use of the IoT device with the authentication desired.

SUMMARY

The present disclosure is directed to multifactor authentication for Internet-of-things ("IoT") devices. An IoT device can be assigned an IP address or other network address by a gateway or other device when the IoT device is activated, powered-up, started up, or at other times. In some embodiments, the IP address can be stored and associated with the IoT device. A security management platform can receive a registration request that can include a request to register an IoT device for multifactor authentication. In response to the registration request, the security management platform can be configured to obtain the IP address associated with the IoT device and/or to ensure that an IP address has been assigned to the IoT device, for example by sending an IP address request to the gateway.

The security management platform also can be configured to request creation, assignment, and/or delivery of a certificate for the IoT device. According to various embodiments, the security management platform can send, to a certificate authority, a certificate request. The security management platform can send the IP address with the certificate request, in some embodiments, and the certificate authority can be configured to deliver the certificate to the IoT device using the IP address and/or other identifiers. According to various embodiments, the certificate authority can be configured to deliver the certificate to the IoT device using an over-the-air ("OTA") channel. The OTA channel can be used to deliver updates to the IoT device and therefore does not have to be initiated by the certificate authority and/or the IoT device specifically for the purpose of delivering the certificate.

The IoT device can store the certificate and use the certificate and/or provide a copy of the certificate in some communications. The IoT device can attempt to access a resource such as an application or data source. The IoT device can send, to a third party device that hosts or executes the resource, an access request. The access request can include, in a header, an IP address or other identifying information associated with the IoT device, a copy of the certificate and/or information identifying the certificate, and a request for access to the resource. The third party device can generate a validation request and send the validation request to the security management platform. The validation request can include a copy of the certificate and/or information that identifies the certificate, in some embodiments. In some embodiments, the validation request can include a copy of the certificate and the IP address and/or other identifying information.

The security management platform can validate the certificate via communicating with the certificate authority. The security management platform also can be configured, in some embodiments, to validate the IP address and/or other identifying information if provided in the validation request. The security management platform can send a decision to the third party device.

In some embodiments, the third party device can request validation of the certificate via the validation request and can also generate an API call to the gateway. The API call can request the IP address associated with the IoT device. The gateway can respond to the API call with the IP address data and the third party device can validate the access request using the obtained IP addresses (obtained from the access request and via the API call). Thus, the third party device can validate the IoT device using multifactor authentication in a standardized manner without the IoT device having a customized multifactor authentication application, or the like, thereby improving security, efficiency associated with providing multifactor authentication, and reducing resource usage associated with providing multifactor authentication. Furthermore, the ability to enable multifactor authentication of the IoT device in a standardized manner can obviate human interaction to enable such functionality. Thus, a user or other entity may not need to perform operations and/or steps to authenticate using multiple factors, rather these and/or other operations may be controlled automatically and/or replaced by the concepts and technologies disclosed herein for multifactor authentication.

According to one aspect of the concepts and technologies disclosed herein, a system is disclosed. The system can include a processor and a memory. The memory can store computer-executable instructions that, when executed by the processor, cause the processor to perform operations. The operations can include receiving an access request from an Internet-of-things device. The access request can include a header that can include identifying information associated with the Internet-of-things device and a certificate that can be used by the Internet-of-things device to encode the access request. The operations also can include requesting, from a security management platform, validation of the certificate obtained with the access request; determining, based on a decision received from the security management platform, if the certificate is validated; and in response to determining that the certificate is validated, identifying the identifying information included in the header, obtaining a stored version of the identifying information associated with the Internet-of-things device, determining if the stored version of the identifying information matches the identifying information included in the header, and in response to determining that the stored version of the identifying information matches the identifying information included in the header, allowing the access request to enable access to a resource.

In some embodiments, the identifying information can include an IP address associated with the Internet-of-things device. The IP address can be assigned to the Internet-of-things device by a gateway, and obtaining the stored version of the IP address can include generating, by the computing device, an application programming interface call that requests, from the gateway, a stored version of the IP address. In some embodiments, the certificate can be delivered to the Internet-of-things device via an over the air channel between the Internet-of-things device and a certificate authority that issues the certificate. In some embodiments, the over the air channel can be used to deliver updates to the Internet-of-things device, and in some embodiments, the over the air channel is not established for delivery of the certificate.

In some embodiments, the operations further can include in response to determining that the certificate is not validated, blocking, by the computing device, the access to the resource. In some embodiments, the computer-executable instructions, when executed by the processor, cause the processor to perform operations further can include in response to determining that the stored version of the identifying information does not match the identifying information included in the header, blocking, by the computing device, the access to the resource.

According to another aspect of the concepts and technologies disclosed herein, a method is disclosed. The method can include receiving, by a computing device, an access request from an Internet-of-things device. The access request can include a header that can include identifying information associated with the Internet-of-things device and a certificate that can be used by the Internet-of-things device to encode the access request. The method also can include requesting, by the computing device and from a security management platform, validation of the certificate obtained with the access request; determining, by the computing device and based on a decision received from the security management platform, if the certificate is validated; and in response to determining that the certificate is validated, identifying, by the computing device, the identifying information included in the header, obtaining, by the computing device, a stored version of the identifying information associated with the Internet-of-things device, determining, by the computing device, if the stored version of the identifying information matches the identifying information included in the header, and in response to determining that the stored version of the identifying information matches the identifying information included in the header, allowing, by the computing device, the access request to enable access to a resource.

In some embodiments, the identifying information can include an IP address associated with the Internet-of-things device. In some embodiments, the IP address can be assigned to the Internet-of-things device by a gateway. In some embodiments, obtaining the stored version of the IP address can include generating, by the computing device, an application programming interface call that requests, from the gateway, a stored version of the IP address. In some embodiments, the certificate can be delivered to the Internet-of-things device via an over the air channel between the Internet-of-things device and a certificate authority that issues the certificate. In some embodiments, the over the air channel can be used to deliver updates to the Internet-of-things device. In some embodiments, the over the air channel is not established for delivery of the certificate.

In some embodiments, requesting validation of the certificate can include generating a validation request, and sending the validation request to the security management platform. In some embodiments, the method also can include in response to determining that the certificate is not validated, blocking, by the computing device, the access to the resource. In some embodiments, the method also can include in response to determining that the stored version of the identifying information does not match the identifying information included in the header, blocking, by the computing device, the access to the resource.

According to yet another aspect, a computer storage medium is disclosed. The computer storage medium can store computer-executable instructions that, when executed by a processor, cause the processor to perform operations. The operations can include receiving an access request from an Internet-of-things device. The access request can include a header including identifying information associated with the Internet-of-things device and a certificate that can be used by the Internet-of-things device to encode the access request. The operations also can include requesting, from a security management platform, validation of the certificate obtained with the access request; determining, based on a decision received from the security management platform, if the certificate is validated; and in response to determining that the certificate is validated, identifying the identifying information included in the header, obtaining a stored version of the identifying information associated with the Internet-of-things device, determining if the stored version of the identifying information matches the identifying information included in the header, and in response to determining that the stored version of the identifying information matches the identifying information included in the header, allowing the access request to enable access to a resource.

In some embodiments, the identifying information can include an IP address that can be associated with the Internet-of-things device. The IP address can be assigned to the Internet-of-things device by a gateway. In some embodiments, obtaining the stored version of the IP address can include generating, by the computing device, an application programming interface call that requests, from the gateway, a stored version of the IP address. In some embodiments, the certificate can be delivered to the Internet-of-things device via an over the air channel between the Internet-of-things device and a certificate authority that issues the certificate. In some embodiments, the over the air channel can be used to deliver updates to the Internet-of-things device. In some embodiments, the over the air channel is not established for delivery of the certificate.

In some embodiments, the computer-executable instructions, when executed by the processor, can cause the processor to perform operations that further can include in response to determining that the certificate is not validated, blocking, by the computing device, the access to the resource. In some embodiments, the computer-executable instructions, when executed by the processor, can cause the processor to perform operations that further can include in response to determining that the stored version of the identifying information does not match the identifying information included in the header, blocking, by the computing device, the access to the resource.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
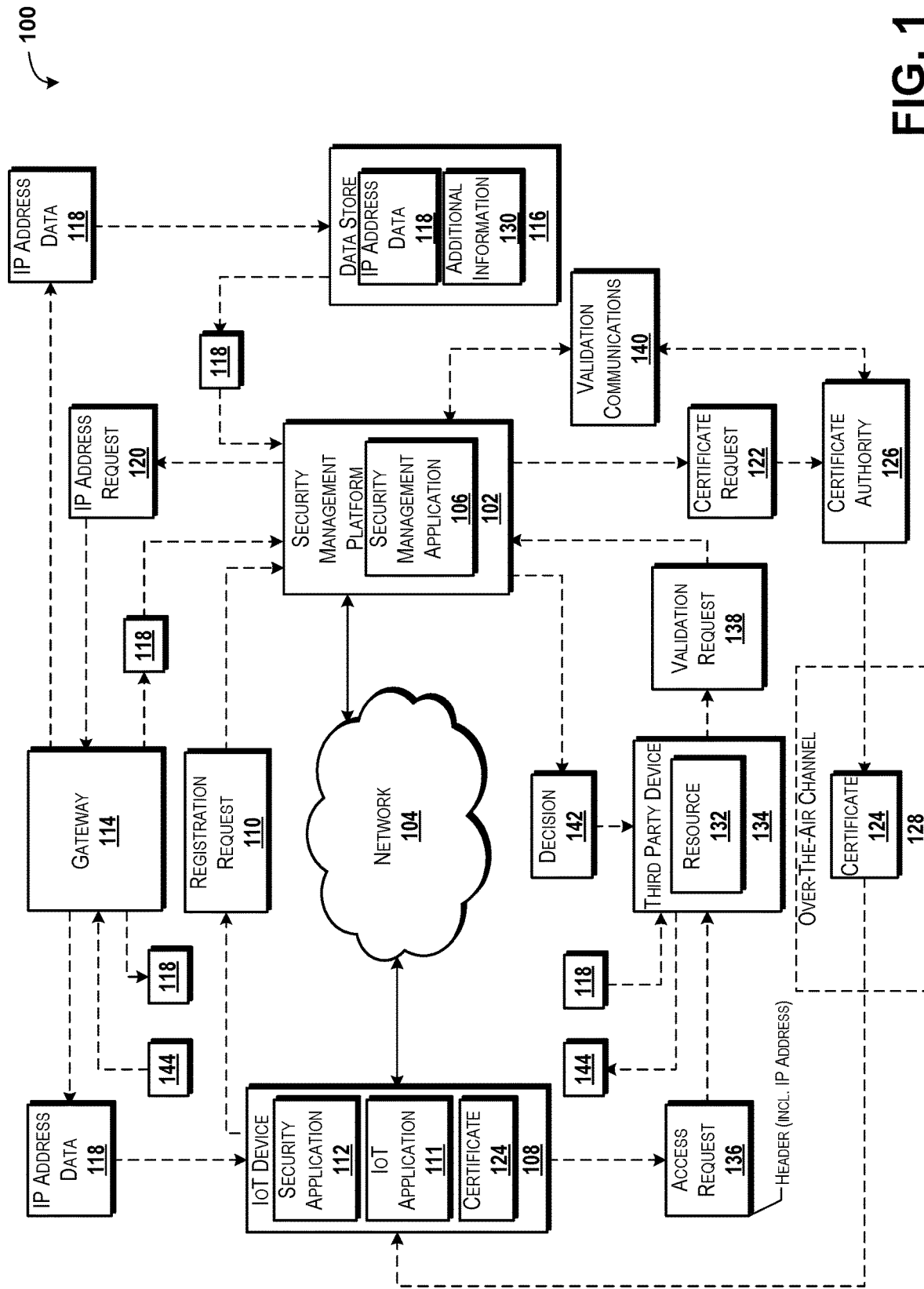
FIG. 1 is a system diagram illustrating an illustrative operating environment for various embodiments of the concepts and technologies described herein.

The following detailed description is directed to multifactor authentication for IoT devices. An IoT device can be assigned an IP address or other network address by a gateway or other device when the IoT device is activated, powered-up, started up, or at other times. In some embodiments, the IP address can be stored and associated with the IoT device. A security management platform can receive a registration request that can include a request to register an IoT device for multifactor authentication. In response to the registration request, the security management platform can be configured to obtain the IP address associated with the IoT device and/or to ensure that an IP address has been assigned to the IoT device, for example by sending an IP address request to the gateway.

The security management platform also can be configured to request creation, assignment, and/or delivery of a certificate for the IoT device. According to various embodiments, the security management platform can send, to a certificate authority, a certificate request. The security management platform can send the IP address with the certificate request, in some embodiments, and the certificate authority can be configured to deliver the certificate to the IoT device using the IP address and/or other identifiers. According to various embodiments, the certificate authority can be configured to deliver the certificate to the IoT device using an OTA channel. The OTA channel can be used to deliver updates to the IoT device and therefore does not have to be initiated by the certificate authority and/or the IoT device specifically for the purpose of delivering the certificate.

The IoT device can store the certificate and use the certificate and/or provide a copy of the certificate in some communications. The IoT device can attempt to access a resource such as an application or data source. The IoT device can send, to a third party device that hosts or executes the resource, an access request. The access request can include, in a header, an IP address or other identifying information associated with the IoT device, a copy of the certificate and/or information identifying the certificate, and a request for access to the resource. The third party device can generate a validation request and send the validation request to the security management platform. The validation request can include a copy of the certificate and/or information that identifies the certificate, in some embodiments. In some embodiments, the validation request can include a copy of the certificate and the IP address and/or other identifying information.

The security management platform can validate the certificate via communicating with the certificate authority. The security management platform also can be configured, in some embodiments, to validate the IP address and/or other identifying information if provided in the validation request. The security management platform can send a decision to the third party device.

In some embodiments, the third party device can request validation of the certificate via the validation request and can also generate an API call to the gateway. The API call can request the IP address associated with the IoT device. The gateway can respond to the API call with the IP address data and the third party device can validate the access request using the obtained IP addresses (obtained from the access request and via the API call). Thus, the third party device can validate the IoT device using multifactor authentication in a standardized manner without the IoT device having a customized multifactor authentication application, or the like, thereby improving security, efficiency associated with providing multifactor authentication, and reducing resource usage associated with providing multifactor authentication.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for multifactor authentication for IoT devices will be described, according to an illustrative embodiment. The operating environment 100 shown in FIG. 1 includes a security management device, module, engine, or platform (hereinafter referred to as the "security management platform") 102. The security management platform 102 can operate in communication with and/or as part of one or more networks such as a communications network ("network") 104.

According to various embodiments, the functionality of the security management platform 102 may be provided by one or more server computers, desktop computers, mobile telephones, laptop computers, set-top boxes, other computing systems, and the like. It should be understood that the functionality of the security management platform 102 can be provided by a single device, by two similar devices, and/or by two or more dissimilar devices including, but not limited to, distributed computing environments or platforms. For purposes of describing the concepts and technologies disclosed herein, the security management platform 102 is described herein as a server computer. It should be understood that this embodiment is illustrative, and should not be construed as being limiting in any way.

The security management platform 102 can execute an operating system (not shown in FIG. 1) and one or more application programs such as, for example, a security management application 106. The operating system can include a computer program for controlling the operation of the security management platform 102. The security management application 106 can include one or more executable programs configured to execute on top of the operating system to provide various functions illustrated and described herein for providing multifactor authentication for IoT devices.

According to various embodiments of the concepts and technologies disclosed herein, the security management platform 102 can be configured, e.g., via execution of the security management application 106, to receive from an IoT device 108, a registration request 110. The registration request 110 can correspond to a request, from the IoT device 108, to register for authentication using the security management platform 102. The security management platform 102 can be configured to perform various operations for registering the IoT device 108 to authenticate using the security management platform 102, as will be explained in more detail below after introducing various other entities and communications associated with the operating environment shown in FIG. 1.

The IoT device 108 can correspond to various types of Internet-of-things ("IoT") devices. As used herein, an "IoT device" such as the IoT device 108 can include any physical object that possesses hardware that enables network connectivity and/or communications, e.g., via the Internet and/or other local or non-local networks, with another network-enabled device such as, for example, a web server, a computer, a device, a network, combinations thereof, or the like. According to various embodiments of the concepts and technologies disclosed herein, the functionality of the IoT device 108 illustrated and described herein can be provided by a network-enabled keyboard, a network-enabled refrigerator or other appliance, a network-enabled lighting system, device, or control, a network-enabled alarm system, device, or control, a network-enabled door lock, other network-enabled devices, a network-enabled home assistant, a network-enabled music player, and/or other IoT devices as generally are understood.

The IoT device 108 illustrated and described herein can execute an operating system (not shown in FIG. 1), an IoT application 111, and a security application 112. The operating system can include a computer program for controlling the operation of the IoT device 108, for example enabling power-up procedures, or the like. The IoT application 111 can include a computer program that is executed on top of the operating system to provide various functions associated with the IoT device 108, and other functions. For example, if the IoT device 108 corresponds to a refrigerator, a processor (not shown in FIG. 1) of the IoT device 108 can be configured to execute the operating system and/or the IoT application 111 to enable functions such as setting temperatures; setting light preferences; accessing a remote application, device, or resource; uploading information to platforms, ordering systems, other entities, or the like; and/or to perform other functions associated with the IoT device 108. Because the IoT device 108 is network-enabled, the operating system and/or the IoT application 111 can be configured to cause the IoT device 108 to request a network address (e.g., an IP address) from a device on power-up, start-up, and/or other activation of the IoT device 108, and/or at other times. For purposes of clarifying the description herein, the network address will be described as an IP address. Because other network addresses are possible and are contemplated, it should be understood that this example is illustrative, and therefore should not be construed as being limiting in any way.

In various embodiments, the IoT device 108 also can be configured (e.g., via the operating system and/or the IoT application 111) to communicate with a gateway 114 to obtain an IP address for the IoT device 108. The gateway 114 can be configured to assign an IP address to the IoT device 108. The gateway 114 also can be configured to report and/or store the IP address. In some embodiments, as shown in FIG. 1, the gateway 114 can send IP address data 118 to the data store 116 and the data store 116 can store the IP address data 118. The functionality of the data store 116 can be provided by one or more data servers, one or more databases, one or more server computers, one or more desktop computers, one or more other computing systems, combinations thereof, or the like.

The IP address data 118 can indicate the IP address for the IoT device 108, which can be identified by the IP address, by a media access control ("MAC") address, by an international mobile equipment identity ("IMEI"), an international mobile subscriber identity ("IMSI"), serial number, or other device-identifying information that can uniquely identify the IoT device 108. The gateway 114 can also be configured to send the IP address data 118 to the IoT device 108, thereby assigning the IP address to the IoT device 108 and/or making knowledge of the IP address available to the IoT device 108. The IoT device 108 can be configured, e.g., via execution of the security application 112, to store data (e.g., the IP address data 118) that identifies the IP address for the IoT device 108. Because IP addresses can be obtained by the IoT device 108 and/or assigned to the IoT device 108 in additional and/or alternative manners (e.g., in some embodiments the IP address may be assigned to the IoT device 108 in response to a request from the security management platform 102 or other device during a registration process as illustrated and described below), it should be understood that this example is illustrative, and therefore should not be construed as being limiting in any way.

The security application 112 can include one or more executable programs. One or more processors (not shown in FIG. 1) of the IoT device 108 can be configured to execute the security application 112 (e.g., on top of the operating system) to provide various functions illustrated and described herein for providing multifactor authentication for IoT devices. In particular, the IoT device 108 can, e.g., via execution of the security application 112, send the registration request 110 to the security management platform 102 as mentioned above and now described in more detail.

Although the IoT application 111 and the security application 112 are illustrated as separate applications, it should be understood that the functionality of both of these applications and/or portions thereof can be provided by a single application, in some embodiments. As such, the illustrated embodiment should be understood as being illustrative and should not be construed as being limiting in any way.

The security management platform 102 can receive the registration request 110 from the IoT device 108 (or other entities) and register the IoT device 108 for use of the security management platform 102 to authenticate the IoT device 108. Registration of the IoT device 108 to use the security management platform 102 can include obtaining an IP address for the IoT device 108, requesting issuance of one or more certificates to the IoT device 108, validating one or more certificates associated with the IoT device 108, and/or other operations as illustrated and described herein for enabling multifactor authentication of IoT devices such as the IoT device 108.

According to some embodiments, the security management platform 102 can be configured to generate, in response to receiving or detecting the registration request 110, an IP address request 120. The security management platform 102 can send the IP address request 120 to the gateway 114, and the gateway 114 can assign the IP address to the IoT device 108 in response to the IP address request 120. In some other embodiments, the IoT device 108 can request and/or can be assigned an IP address prior to the registration request 110 and/or prior to sending the IP address request 120 (and/or without sending the IP address request 120). As such, the IP address request 120 may be omitted in various embodiments. Thus, it should be understood that during registration, the security management platform 102 can either trigger assignment of an IP address to the IoT device 108 or verify that the IoT address has been assigned to the IoT device 108.

In some embodiments, the IP address request 120 can be sent to the gateway 114 or other device by the security management platform 102 to obtain identification of the IP address. The security management platform 102 can receive the IP address data 118 from the gateway 114, the data store 116, or other entities to inform the security management platform 102 of the IP address of the IoT device 108.

Thus, in some embodiments, the security management platform 102 can store the IP address data 118 during registration (as opposed to the IP address data 118 being stored by the gateway 114 as mentioned above). Regardless of how and when the IP address is assigned to the IoT device 108, the security management platform 102 can obtain IP address data 118 and/or otherwise identify the IP address associated with the IoT device 108. It should be understood that this example is illustrative, and therefore should not be construed as being limiting in any way.

The security management platform 102 also can be configured to generate a certificate request 122. The certificate request 122 can request creation of a digital certificate (referred to herein as a "certificate") 124 for the IoT device 108, assignment of the certificate 124 to the IoT device 108, and/or delivery of a certificate 124 to the IoT device 108 by a certificate authority 126. According to various embodiments, the functionality of the certificate authority 126 can be provided by an application and/or service hosted on a server such as, for example, the COMODO brand certificate authority ("CA"), the SYMANTEC brand CA, the GODADDY brand CA, the GLOBALSIGN brand CA, and/or other certificate authorities as generally are known. It should be understood that these examples are illustrative, and therefore should not be construed as being limiting in any way.

The certificate authority 126 can be configured to deliver the certificate 124 for the IoT device 108, as requested by way of the certificate request 122, to the IoT device 108. It can be appreciated that the security management platform 102 can include, in the certificate request 122, the IP address of the IoT device 108. Thus, the certificate authority 126 can be configured to deliver the certificate 124 to the IoT device 108 using the IP address. The IoT device 108 can be configured to store the certificate 124 at the IoT device 108, e.g., in a memory or other data storage device (not visible in FIG. 1).

According to various embodiments of the concepts and technologies disclosed herein, the certificate authority 126 can be configured to deliver the certificate 124 to the IoT device 108 using an OTA channel 128 (labeled "over-the-air channel 128" in FIG. 1). The OTA channel 128 can be used by various devices to deliver data to the IoT device 108. According to various embodiments of the concepts and technologies disclosed herein, the OTA channel 128 can be used by various entities to deliver updates to the IoT device 108. Thus, the OTA channel 128 can exist and can be used by the certificate authority 126 to deliver the certificate 124 to the IoT device 108 without initiating a new communication path and/or channel. In other words, in various embodiments of the concepts and technologies disclosed herein, the OTA channel 128 is not established by the IoT device 108 and/or the certificate authority 126 for purposes of delivering the certificate 124. Thus, the OTA channel 128 illustrated and described herein can include a communication channel and/or path that is used by the IoT device 108 to receive updates from other entities and/or to receive other data. It should be understood that this example is illustrative, and therefore should not be construed as being limiting in any way.

Upon delivery of the certificate 124 to the IoT device 108 and assignment of the IP address to the IoT device 108, the IoT device 108 can be considered by the security management platform 102 to be registered for authentication by the security management platform 102. It should be appreciated that in various embodiments, the IP address data 118 illustrated and described herein can be stored with additional information 130 that can relate to the IoT device 108 and/or that can be used to authenticate the IoT device 108. For example, the additional information 130 can include, for example, geographic location data associated with the IoT device 108, model number and/or serial number information associated with the IoT device 108, passwords and/or logins associated with the IoT device 108, device state information associated with the IoT device 108, an IMEI associated with the IoT device 108, an IMSI associated with the IoT device 108, location patterns associated with the IoT device 108, combinations thereof, or the like. Thus, as will be understood with reference to the described embodiments, the additional information 130 can be used to authenticate the IoT device 108 in a manner that can be similar to the manner in which the IP address is used as illustrated and described herein. Thus, while the illustrated and described embodiments are described as using the IP address to authenticate the IoT device 108, it should be understood that this example is illustrative, and therefore should not be construed as being limiting in any way.

The IoT device 108 can be configured to use multifactor authentication to access a service or device as will now be explained in detail. According to various embodiments, the IoT device 108 can attempt to access a resource 132. The resource 132 can correspond, in various embodiments, to an application, a data source, a portal, and/or other functionality that can be hosted and/or provided by a third party device 134. As used herein, the phrase "third party" can be used to refer to an entity such as a computing device having a memory and a processor, where the computing device is not owned by and/or under control of the IoT device 108, the gateway 114, and/or the security management platform 102. As such, the IoT device 108 can be required to authenticate with the third party device 134 to access the resource 132, in various embodiments. According to various embodiments, the functionality of the third party device 134 can be provided by almost any device having a processor and access to stored data including, but not limited to, a computer; a virtual machine; a customer backend system, device, and/or other entity; a server; a network and/or network component; other devices, systems, and/or networks; combinations thereof; or the like. It should be understood that this example is illustrative, and therefore should not be construed as being limiting in any way.

According to various embodiments, the IoT device 108 can initiate access to the resource 132 by sending, to the third party device 134, an access request 136. The access request 136 can correspond, in various embodiments, to a message having a header. According to various embodiments, the header can include the IP address data 118 that identifies the IP address of the IoT device 108. Other information can be included in the header such as the data illustrated and described above with reference to the additional information 130, or the like. The body of the message can include a request to access the resource 132. In various embodiments, the access request 136 can be encoded by the IoT device 108 using the certificate 124.

The third party device 134 can be configured to authenticate the IoT device 108 before allowing the IoT device 108 to access the resource 132. In various embodiments, the third party device 134 can be configured to authenticate the IoT device 108 using multifactor authentication. In particular, the third party device 134 can submit, to the security management platform 102, a validation request 138. The validation request 138 can include certificate information that relates to the certificate 124. In some embodiments, for example, the validation request 138 can be sent to the security management platform 102 with a copy of the certificate 124. It should be understood that in some embodiments, the validation request 138 also can be sent to the security management platform 102 with IP address data 118 that identifies the IP address of the IoT device 108 and/or or other information as illustrated and described herein such as the additional information 130 described herein. It should be understood that this example is illustrative, and therefore should not be construed as being limiting in any way.

The security management platform 102 can be configured to validate the access request 136 by validating the certificate 124 provided and/or used by the IoT device 108. In particular, the security management platform 102 can communicate with the certificate authority 126 to validate the certificate 124 via validation communications 140 with the certificate authority 126. The validation communications 140 can include queries relating to the certificate 124 and/or the IP address or other identifying information to verify that the certificate 124 provided by the IoT device 108 is authentic. The certificate authority 126 can determine if the certificate 124 is authentic or inauthentic and inform the security management platform 102 about the determination. The security management platform 102 can send a decision 142 to the third party device 134. The decision 142 can indicate that the IoT device 108 is authenticated or not authenticated. The third party device 134 can be configured to allow the IoT device 108 to access the resource 132 if the decision 142 indicates that the IoT device 108 is authenticated. The third party device 134 can be configured to block the IoT device 108 from accessing the resource 132 if the decision 142 indicates that the IoT device 108 is not authenticated.

The third party device 134 also can be configured to validate the IP address or other identifying information obtained from the IoT device 108. The validation of the IP address or identifying information obtained from the IoT device 108 can be completed by the third party device 134 before, during, or after validation of the certificate 124 to provide multifactor authentication. Of course, the third party device 134 can be configured not to authenticate the IP address or other identifying information obtained from the IoT device 108 if the certificate is not validated.

To validate the IP address or identifying information obtained from the IoT device 108, the third party device 134 can be configured to call an application programming interface ("API") exposed by the gateway 114 to obtain the IP address associated with the IoT device 108, in some embodiments. This is illustrated in FIG. 1 schematically by showing the API call 144. It should be understood that this example is illustrative, and therefore should not be construed as being limiting in any way.

In some other embodiments, the third party device 134 can be configured to obtain the identifying information (e.g., the IP address) via a request from the security management platform 102, wherein the security management platform 102 can be configured to call the API of the gateway 114 to obtain the IP address and/or to access the additional information 130 and/or other data sources for the IP address and/or other identifying information as illustrated and described herein. Thus, the validation request 138 can be sent with a request to verify the IP address and/or other identifying information. It should be understood that this example is illustrative, and therefore should not be construed as being limiting in any way.

The third party device 134 can receive, from the gateway 114 or other entity such as the security management platform 102, the IP address data 118 in response to the API call 144. Thus, the third party device 134 can receive the IP address data 118 in response to the API call 144. The third party device 134 can determine if the IP address obtained from the gateway 114 matches the IP address obtained in the access request 136 (or can compare the identifying information obtained from other sources to the identifying information received in the access request 136). If the IP addresses or other identifying information match, the third party device 134 can allow the access to the resource 132. If the IP addresses or other identifying information do not match, the third party device 134 can block or disallow the access to the resource 132.

In practice, an IoT device 108 can be assigned an IP address or other network address by a gateway 114 or other device when the IoT device 108 is activated, powered-up, started up, or at other times. In some embodiments, the IP address can be stored and associated with the IoT device 108. A security management platform 102 can receive a registration request 110 that can include a request to register an IoT device 108 for multifactor authentication. In response to the registration request 110, the security management platform 102 can be configured to obtain the IP address associated with the IoT device 108 and/or to ensure that an IP address has been assigned to the IoT device 108, for example by sending an IP address request 120 to the gateway 114. The security management platform 102 also can be configured to request creation, assignment, and/or delivery of a certificate 124 for the IoT device 108.

According to various embodiments, the security management platform 102 can send, to a certificate authority 126, a certificate request 122. The security management platform 102 can send the IP address with the certificate request 122, in some embodiments, and the certificate authority 126 can be configured to deliver the certificate 124 to the IoT device 108 using the IP address and/or other identifiers. According to various embodiments, the certificate authority 126 can be configured to deliver the certificate 124 to the IoT device 108 using an OTA channel 128. The OTA channel 128 can be used to deliver updates to the IoT device 108 and therefore does not have to be initiated by the certificate authority 126 and/or the IoT device 108 specifically for the purpose of delivering the certificate 124. Thus, the use of the OTA channel 128 for delivery of the certificate 124 in accordance with various embodiments of the concepts and technologies disclosed herein can result in improved efficiency and resource usage for the devices illustrated and described with reference to the operating environment 100 while providing multifactor authentication. It should be understood that this example is illustrative, and therefore should not be construed as being limiting in any way.

The IoT device 108 can store the certificate 124 and use the certificate 124 and/or provide a copy of the certificate 124 in some communications. The IoT device 108 can attempt to access a resource 132 such as an application or data source. The IoT device 108 can send, to a third party device 134 that hosts or executes the resource 132, an access request 136. The access request 136 can include, in a header, an IP address or other identifying information associated with the IoT device 108, a copy of the certificate 124 and/or information identifying the certificate 124, and a request for access to the resource 132. The third party device 134 can generate a validation request 138 and send the validation request 138 to the security management platform 102. The validation request 138 can include a copy of the certificate 124 and/or information that identifies the certificate 124, in some embodiments. In some embodiments, the validation request 138 can include a copy of the certificate 124 and the IP address and/or other identifying information. The security management platform 102 can validate the certificate 124 via communicating with the certificate authority 126. The security management platform 102 also can be configured, in some embodiments, to validate the IP address and/or other identifying information if provided in the validation request 138. The security management platform 102 can send a decision 142 to the third party device 134.

In some embodiments, the third party device 134 can request validation of the certificate 124 via the validation request 138 and can also generate an API call 144 to the gateway 114. The API call 144 can request the IP address associated with the IoT device 108. The gateway 114 can respond to the API call 144 with the IP address data 118 and the third party device 134 can validate the access request 136 using the obtained IP addresses (obtained from the access request 136 and via the API call 144). Thus, the third party device 134 can validate the IoT device 108 using multifactor authentication in a standardized manner without the IoT device 108 having a customized multifactor authentication application, or the like, thereby improving security, efficiency associated with providing multifactor authentication, and reducing resource usage associated with providing multifactor authentication.

FIG. 1 illustrates one security management platform 102, one network 104, one IoT device 108, one gateway 114, one data store 116, one certificate authority 126, and one third party device 134. It should be understood, however, that various implementations of the operating environment 100 can include one or more than one security management platform 102; one or more than one network 104; one or more than one IoT device 108; one or more than one gateway 114; zero, one, or more than one data store 116; one or more than one certificate authority 126; and one or more than one third party device 134. As such, the illustrated embodiment should be understood as being illustrative, and should not be construed as being limiting in any way.

Figure 2:
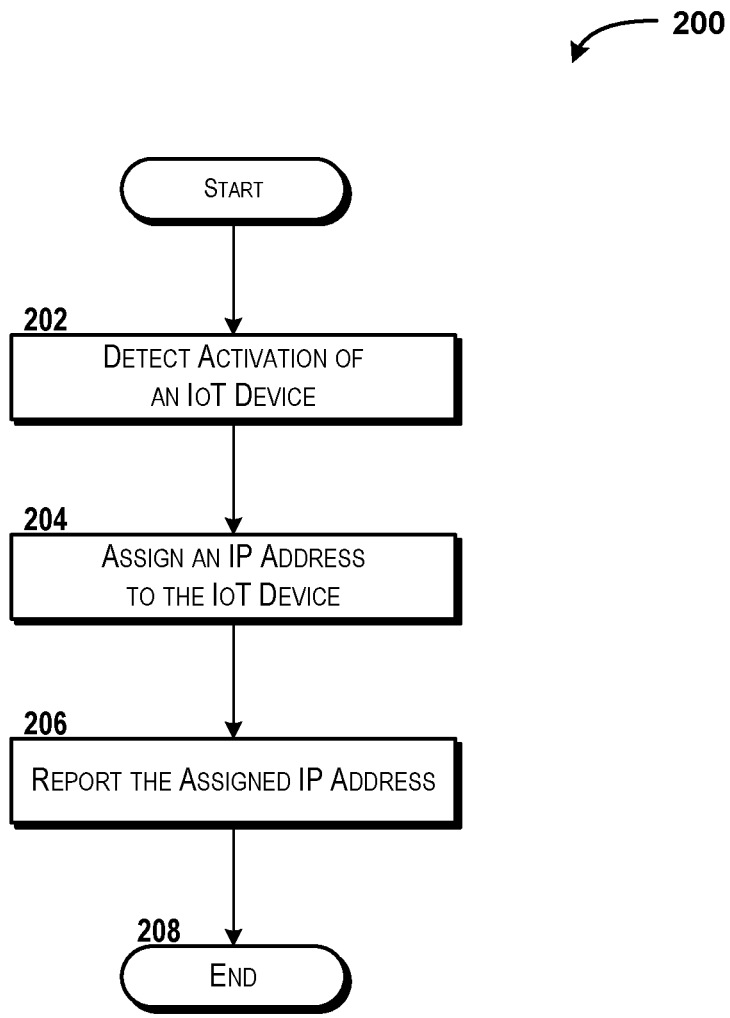
FIG. 2 is a flow diagram showing aspects of a method for assigning an IP address to an IoT device, according to an illustrative embodiment of the concepts and technologies described herein.

Turning now to FIG. 2, aspects of a method 200 for assigning an IP address to an IoT device 108 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the security management platform 102, the gateway 114, the third party device 134, or other entities, to perform one or more operations and/or causing the processor to direct other components of the computing system or device to perform one or more of the operations.

For purposes of illustrating and describing the concepts of the present disclosure, the method 200 is described herein as being performed by the gateway 114 via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 begins at operation 202. At operation 202, the gateway 114 can detect activation of a device such as, for example, the IoT device 108. Alternatively, as explained with reference to FIG. 1, the gateway 114 can receive an IP address request 120 that can be generated, for example, by the security management platform 102 during a registration process for the IoT device 108. In some embodiments, the IoT device 108 can be configured to communicate with the gateway 114 on activation of the IoT device 108 and the gateway 114 can be configured to detect the communication as activation of the IoT device 108. Regardless of how the activation of the IoT device 108 is detected, the gateway 114 can determine, in response to detecting the activation of the IoT device 108, that an IP address is to be assigned to the IoT device 108.

From operation 202, the method 200 can proceed to operation 204. At operation 204, the gateway 114 can assign an IP address to the IoT device 108 associated with the detected activation in operation 202. In some embodiments, the IP address assigned in operation 204 can correspond to other types of network addresses. For purposes of clarity, however, the example of the IP address is described herein with reference to FIG. 2. It should be understood that addresses and/or address protocols can be used in various embodiments. As such, while the example of an IP address is used throughout this disclosure to describe assignment of a network address, it should be understood that this example is illustrative, and therefore should not be construed as being limiting in any way.

From operation 204, the method 200 can proceed to operation 206. At operation 206, the gateway 114 can report the assigned IP address to one or more entities. According to various embodiments of the concepts and technologies disclosed herein, the gateway 114 can generate IP address data 118 that identifies the IP address assigned to the IoT device 108. The gateway 114 can send the IP address data 118 to the IoT device 108, thereby informing the IoT device 108 of its IP address. The gateway 114 also can be configured to store the IP address data 118 elsewhere such as, for example, the data store 116. Thus, the gateway 114 can send the IP address data 118 to the data store 116 for storage, in some embodiments of operation 206. In yet other embodiments, the gateway 114 can be configured to provide the IP address data 118 to the security management platform 102 for storage at the security management platform 102 or elsewhere. Because the IPO address can be stored elsewhere and/or reported to various entities, it should be understood that this example is illustrative, and therefore should not be construed as being limiting in any way.

Although not separately shown in FIG. 2, it should be understood that the gateway 114 can be configured to respond to queries and/or API calls for the IP address and/or IP address data 118 in various embodiments. Thus, the gateway 114 can be configured to receive a request, query, and/or API call for the IP address and/or IP address data 118 from one or more of the security management platform 102, the IoT device 108, and/or the third party device 134 as illustrated and described herein. The gateway 114 also can be configured to respond to the request, query, and/or API call by sending the IP address data 118 to one or more of the requesting entities such as, for example, the security management platform 102, the IoT device 108, and/or the third party device 134 as illustrated and described with reference to FIG. 1 above. It should be understood that these examples are illustrative, and therefore should not be construed as being limiting in any way.

From operation 206, the method 200 can proceed to operation 208. The method 200 can end at operation 208.

Figure 3:
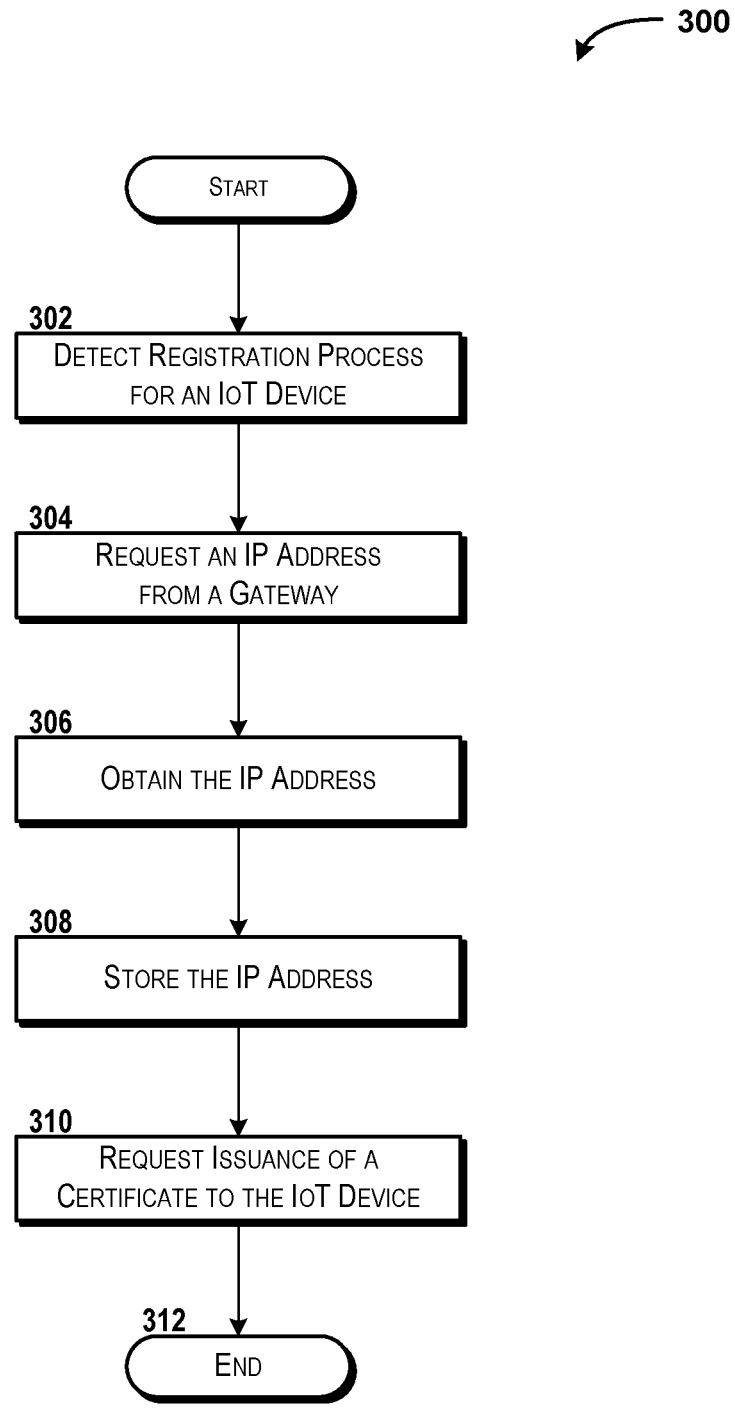
FIG. 3 is a flow diagram showing aspects of a method for registering an IoT device for multifactor authentication, according to an illustrative embodiment of the concepts and technologies described herein.

Turning now to FIG. 3, aspects of a method 300 for registering an IoT device for multifactor authentication will be described in detail, according to an illustrative embodiment. For purposes of illustrating and describing the concepts of the present disclosure, the method 300 is described herein as being performed by the security management platform 102 via execution of one or more software modules such as, for example, the security management application 106. It should be understood that additional and/or alternative devices and/or network nodes can provide the functionality described herein via execution of one or more modules, applications, and/or other software including, but not limited to, the security management application 106. Thus, the illustrated embodiments are illustrative, and should not be viewed as being limiting in any way.

The method 300 begins at operation 302. At operation 302, the security management platform 102 can detect a registration process for an IoT device such as the IoT device 108. As illustrated and described above with reference to FIG. 1, the security management platform 102 can detect the registration process by receiving a request from an entity. For example, the security management platform 102 can receive a registration request 110 in some embodiments. In some other embodiments, the gateway 114 can be configured to send data indicating an assigned IP address for an IoT device (e.g., by sending the IP address data 118) in response to assigning an IP address to an IoT device 108, and the security management platform 102 can be configured to initiate registration of the IoT device 108 in response to receiving the IP address data 118 from the gateway 114. For purposes of clarifying the description of the concepts and technologies disclosed herein, operation 302 will be described as corresponding to the security management platform 102 receiving the registration request 110. Because the security management platform 102 can detect a registration process in additional and/or alternative manners, it should be understood that this example is illustrative, and therefore should not be construed as being limiting in any way.

From operation 302, the method 300 can proceed to operation 304. At operation 304, the security management platform 102 can request the IP address associated with the IoT device 108 from the gateway 114. In some embodiments, for example, the security management platform 102 can send an IP address request 120 to the gateway 114 to either request identification of the IP address of the IoT device 108 or to assign the IP address to the IoT device 108. As noted above with reference to FIG. 2, the gateway 114 can be configured to assign the IP address to the IoT device 108 in response to receiving the IP address request 120, or to send the IP address data 118 to the security management platform 102 in response to the IP address request 120. It should be recalled that in some embodiments, the IP address data 118 can be stored in a data store 116 or other data storage device or location, and that as such operation 304 can correspond to the security management platform 102 querying the data store 116 or other data storage device or location for the IP address. As such, the illustrated embodiment is illustrative and should not be construed as being limiting in any way.

From operation 304, the method 300 can proceed to operation 306. At operation 306, the security management platform 102 can obtain the IP address. It can be appreciated with reference to the description of operation 304 that the IP address can be obtained from the gateway 114, from the data store 116, and/or other entities. From operation 306, the method 300 can proceed to operation 308. At operation 308, the security management platform 102 can store the obtained IP address in a local or remote data storage location and/or device (e.g., a memory of the security management platform 102, the data store 116, and/or other devices or locations). It should be understood that these examples are illustrative, and therefore should not be construed as being limiting in any way.

From operation 308, the method 300 can proceed to operation 310. At operation 310, the security management platform 102 can request issuance of a certificate 124 to the IoT device 108. In various embodiments, the security management platform 102 can send certificate request 122 to a certificate authority such as the certificate authority 126 shown in FIG. 1. The certificate request 122 can include the IP address and/or data identifying the IP address (e.g., the IP address data 118). The certificate authority 126 can be configured to generate a certificate 124 and/or assign a certificate 124 to the IoT device 108 and trigger delivery of the certificate 124 to the IoT device 108 via the OTA channel 128 as illustrated and described above with reference to FIG. 1. The delivery of the certificate 124 can be made using the IP address and/or IP address data 118 as explained above. It should be understood that this example is illustrative, and therefore should not be construed as being limiting in any way.

From operation 310, the method 300 can proceed to operation 312. The method 300 can end at operation 312.

Figure 4:
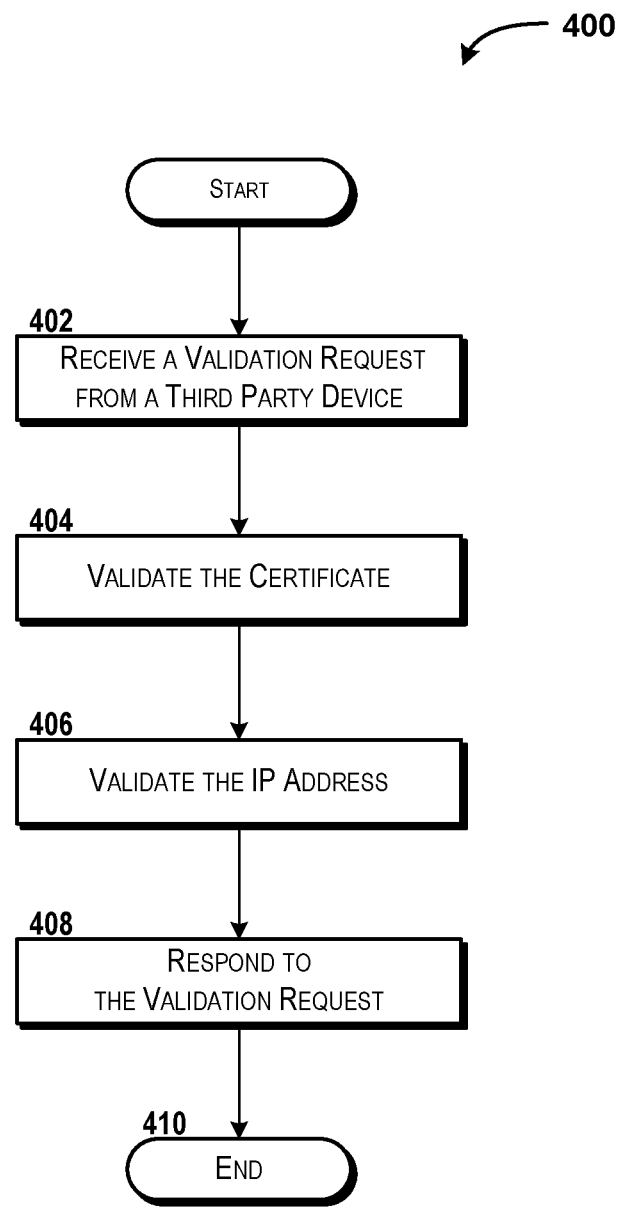
FIG. 4 is a flow diagram showing aspects of a method for validating an IoT device using multifactor authentication, according to an illustrative embodiment of the concepts and technologies described herein.

Turning now to FIG. 4, aspects of a method 400 for validating an IoT device using multifactor authentication will be described in detail, according to an illustrative embodiment. For purposes of illustrating and describing the concepts of the present disclosure, the method 400 is described herein as being performed by the security management platform 102 via execution of one or more software modules such as, for example, the security management application 106. It should be understood that additional and/or alternative devices and/or network nodes can provide the functionality described herein via execution of one or more modules, applications, and/or other software including, but not limited to, the security management application 106. Thus, the illustrated embodiments are illustrative, and should not be viewed as being limiting in any way.

The method 400 begins at operation 402. At operation 402, the security management platform 102 can receive a validation request, e.g., the validation request 138, from a third party device such as the third party device 134. The validation request 138 can be generated by the third party device 134 in response to receiving an access request 136 as explained above. The access request 136 can request access to the resource 132, which can be hosted and/or executed by the third party device 134, wherein the access is requested by the IoT device 108.

It should be understood that the IoT device 108 may request access to the resource 132 for various reasons. For example, if the resource 132 is an application, the IoT device 108 may request access to the resource 132 for purposes of executing the application to provide functionality at the IoT device 108. For example, the application may correspond to an ordering platform and the IoT device 108 may interface with the ordering platform on behalf of a user of the IoT device 108. It should be understood that this example is illustrative, and therefore should not be construed as being limiting in any way. As another example, the resource 132 may correspond to a data structure such as, for example, a shopping list. The IoT device 108 may interface with the resource 132 to create, modify, delete, or otherwise interact with the shopping list for various purposes. Because other resources 132 are possible and are contemplated, it should be understood that these examples are illustrative, and therefore should not be construed as being limiting in any way.

Regardless of what the access request 136 is requesting access to and/or regardless of what the resource 132 corresponds to, the access request 136 can include at least one packet having a header. The packet header can include an IP address for the IoT device and/or other identifying information as explained above. The packet body can correspond to a request for access to the resource 132. The access request 136 also can be sent with a copy of the certificate 124 and/or data that identifies the certificate 124. Thus, the access request 136 illustrated and described herein can include at least a packet having a header that includes identifying information associated with the IoT device 108; data that identifies the certificate 124 or a copy of the certificate 124; and a request for access to the resource 132. It should be understood that this example is illustrative, and therefore should not be construed as being limiting in any way.

From operation 402, the method 400 can proceed to operation 404. At operation 404, the security management platform 102 can validate the certificate 124 obtained from the IoT device 108. In particular, the security management platform 102 can communicate with the certificate authority 126 to validate the received certificate 124. The communications between the security management platform 102 and the certificate authority 126 can include the validation communications 140 illustrated and described above. It can be appreciated that the validation communications 140 can include data corresponding to the certificate 124 and/or data identifying the certificate 124, by which the certificate authority 126 can validate the certificate 124 received by the third party device 134 and/or the security management platform 102. A valid certificate 124 can indicate that the access request 136 is valid/authenticated if the IP address or other identifying information is also authenticated. An invalid certificate 124 can indicate that the access request 136 is invalid/unauthenticated. It should be understood that this example is illustrative, and therefore should not be construed as being limiting in any way.

From operation 404, the method 400 can proceed to operation 406. At operation 406, the security management platform 102 can validate the IP address associated with the IoT device 108. In various embodiments, the validation request 138 can include the IP address as illustrated and described above. Thus, the security management platform 102 can be configured to compare the IP address received by the third party device 134 with the access request 136 to an IP address stored for the IoT device 108. In some embodiments, the security management platform 102 can request the IP address associated with the IoT device 108 from the gateway 114, e.g., by sending an IP address request 120 to the gateway 114. In some other embodiments, the security management platform 102 can access the data store 116 or other data storage device or location as explained above to determine the IP address stored for the IoT device 108. In operation 406, these IP addresses can be compared by the security management platform 102. A matching IP address can indicate that the access request 136 is valid/authenticated if the certificate is also authenticated. A non-matching IP address can indicate that the access request 136 is invalid/unauthenticated. It should be understood that this example is illustrative, and therefore should not be construed as being limiting in any way.

From operation 406, the method 400 can proceed to operation 408. At operation 408, the security management platform 102 can respond to the validation request 138 received in operation 402. Thus, in operation 408 the security management platform 102 can send the decision 142 to the third party device 134. The decision 142 can indicate if the access request 136 is authenticated (e.g., if the IP addresses match and the certificate is validated). The decision alternatively can indicate that the access request 136 is not authenticated (e.g., if the IP addresses do not match or if the certificate is not validated).

From operation 408, the method 400 can proceed to operation 410. The method 400 can end at operation 410.

Figure 5:
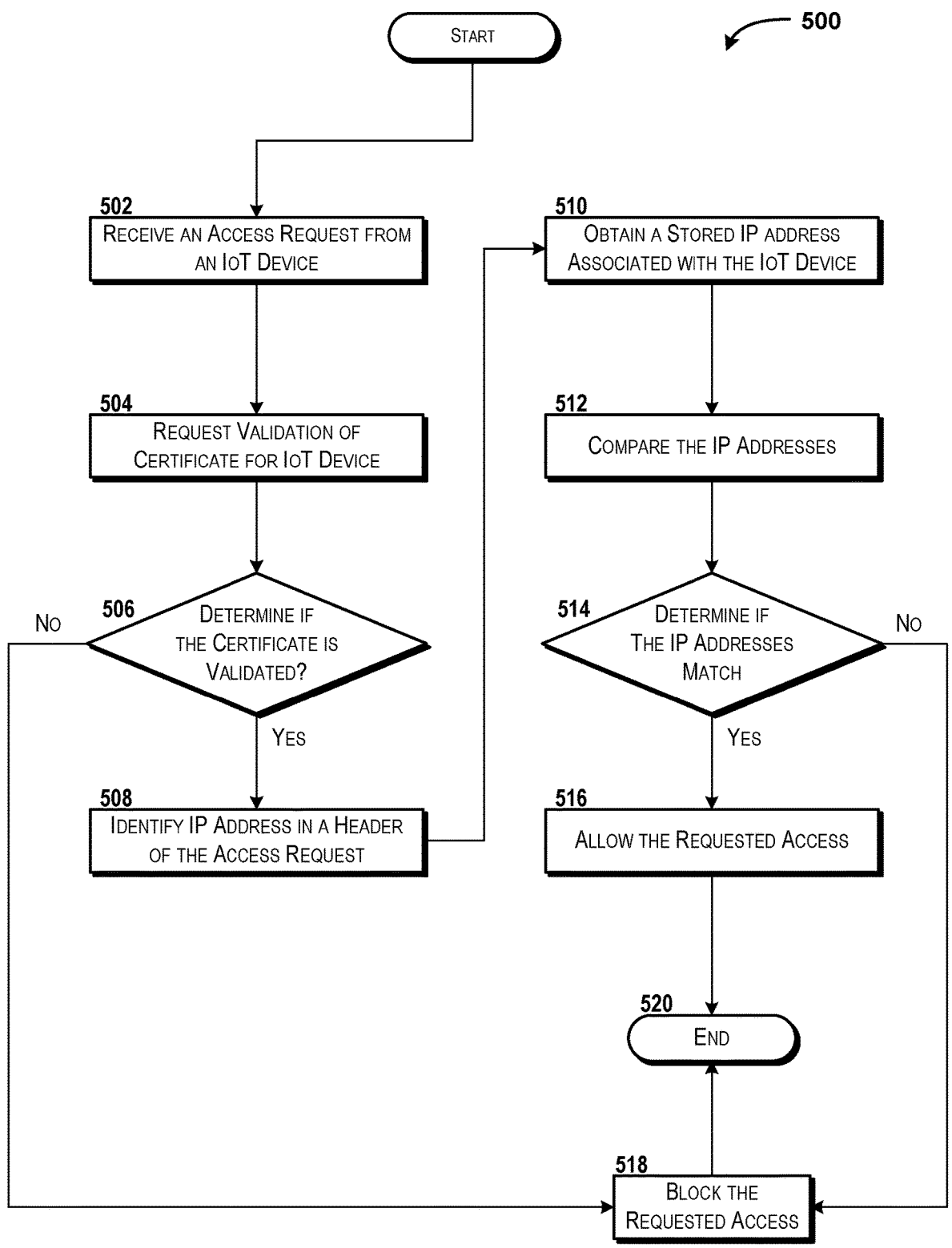
FIG. 5 is a flow diagram showing aspects of a method for allowing or blocking resource access by an IoT device using multifactor authentication, according to an illustrative embodiment of the concepts and technologies described herein.

Turning now to FIG. 5, aspects of a method 500 for allowing or blocking resource access by an IoT device using multifactor authentication will be described in detail, according to an illustrative embodiment. For purposes of illustrating and describing the concepts of the present disclosure, the method 500 is described herein as being performed by the third party device 134 via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 500 begins at operation 502. At operation 502, the third party device 134 can receive an access request, e.g., the access request 136 shown in FIG. 1, from an IoT device such as the IoT device 108. The access request 136 received in operation 502 can correspond, in various embodiments, to a message having a header. According to various embodiments, the header can include the IP address data 118 that identifies the IP address of the IoT device 108 or other identifying information associated with the IoT device 108 as illustrated and described above with reference to FIG. 1. As explained with reference to FIG. 4, the body of the message can include a request to access the resource 132, and as such, the access request 136 can include at least one packet of data having a header including identifying information and a body that includes a request to access the resource 132. The access request 136 can be encoded by the IoT device 108 using the certificate 124 and can include the certificate 124 and/or data that identifies the certificate 124. It should be understood that this example is illustrative, and therefore should not be construed as being limiting in any way.

From operation 502, the method 500 can proceed to operation 504. At operation 504, the third party device 134 can request validation of the certificate 124. In various embodiments, the third party device 134 can generate a validation request 138 that requests validation of the certificate 124, and can send the validation request 138 to the security management platform 102 or other entity that can validate the certificate 124. The security management platform 102 (or other entity) can respond with a decision such as the decision 142, which can indicate whether or not the certificate 124 is validated.

From operation 504, the method 500 can proceed to operation 506. At operation 506, the third party device 134 can determine whether the certificate 124 was validated. If the third party device 134 determines, in operation 506, that the certificate 124 has been validated, the method 500 can proceed to operation 508. At operation 508, the third party device 134 can identify an IP address or other identifying information in the header of the access request 136. The IP address identified in operation 508 can be stored by the third party device 134 (e.g., in a memory, a cache, a data storage device, or the like), or sent to another entity to validate the IP address if desired. In some embodiments, the IP address can be substituted for by other identifying information as explained herein in multiple places. As such, the example of using an IP address is illustrative and should not be construed as being limiting in any way.

From operation 508, the method 500 can proceed to operation 510. At operation 510, the third party device 134 can obtain a stored IP address (or other identifying information) associated with the IoT device 108. According to various embodiments, the third party device 134 can generate an API call 144 in operation 510. As illustrated and described above with reference to FIG. 1, the API call generated by the third party device 134 can be created by the third party device 134 by invoking an API exposed by the gateway 114 to obtain the IP address associated with the IoT device 108. The gateway 114 can respond to the API call by sending the IP address data 118 to the third party device 134. It should be understood that this example is illustrative, and therefore should not be construed as being limiting in any way.

In some other embodiments, the third party device 134 can access other identifying information associated with the IoT device 108. For example, the third party device 134 can obtain, from a data storage location or device such as the data store 116, from the security management platform 102, or other entities, identifying information that is stored for the IoT device 108 and/or associated with the IoT device 108.

From operation 510, the method 500 can proceed to operation 512. In operation 512, the third party device 134 can compare the two versions of the IP address (or other identifying information) obtained in operations 508 and 510. From operation 512, the method 500 can proceed to operation 514, wherein the third party device 134 can determine, based on the comparing in operation 512, if the two versions of the IP addresses (or other identifying information) match one another.

If the third party device 134 determines, in operation 514, that the two versions of the IP addresses obtained in operations 508 and 510 match one another, the method 500 can proceed to operation 516. At operation 516, the third party device 134 can allow the requested access. Thus, it can be appreciated that the determination by the third party device 134 that the two versions of the IP addresses (or other identifying information) match one another can correspond to a determination that the access request 136 is authenticated by at least two types of authentication; and that the access request should be allowed.

If the third party device 134 determines, in operation 514, that the two versions of the IP addresses obtained in operations 508 and 510 do not match one another, the method 500 can proceed to operation 518. The method 500 also can proceed to operation 518 if the third party device 134 determines, in operation 506, that the certificate 124 is not validated. At operation 518, the third party device 134 can block the requested access. Thus, in operation 518, the third party device 134 can deny the access request 136, cease communications with the IoT device 108, and/or otherwise prevent the IoT device 108 from accessing the resource 132.

From operation 518, the method proceeds to operation 520. The method 500 can end at operation 520.

The above-described concepts and technologies for multifactor authentication can be used for almost any type of IoT device, and therefore can provide multifactor authentication for various IoT devices without requiring dedicated security protocols, policies, devices, or the like. In particular, an IoT device such as the IoT device 108 can be configured, e.g., via the IoT application 111 and/or the security application 112, to communicate with the security management platform 102 and/or the gateway 114. Thus, the IoT device 108 can be configured, e.g., via the IoT application 111 and/or the security application 112, to obtain, from the gateway 114, an assigned IP address and/or to exchange other identifying information with the gateway 114. The IoT device 108 also can be configured to generate a registration request 110 to obtain a certificate 124. Also, the IoT device 108 can be configured, e.g., via the IoT application 111 and/or the security application 112, to generate an access request 136 that includes the IP address (or other identifying information), the certificate 124, and the request to access the resource 132, thereby enabling the multifactor authentication illustrated and described herein. Thus, any IoT device 108 can be configured to use the concepts and technologies disclosed herein by way of including the IoT application 111 and/or the security application 112, by enabling access to the OTA channel 128, enabling access to the third party device 134 (access to the gateway 114 and the security management platform 102 also may be provided and/or enabled), as well as by providing the IoT device 108 with a data storage location for the certificate 124. It should be understood that this embodiment is illustrative, and therefore should not be construed as being limiting in any way.

Figure 6:
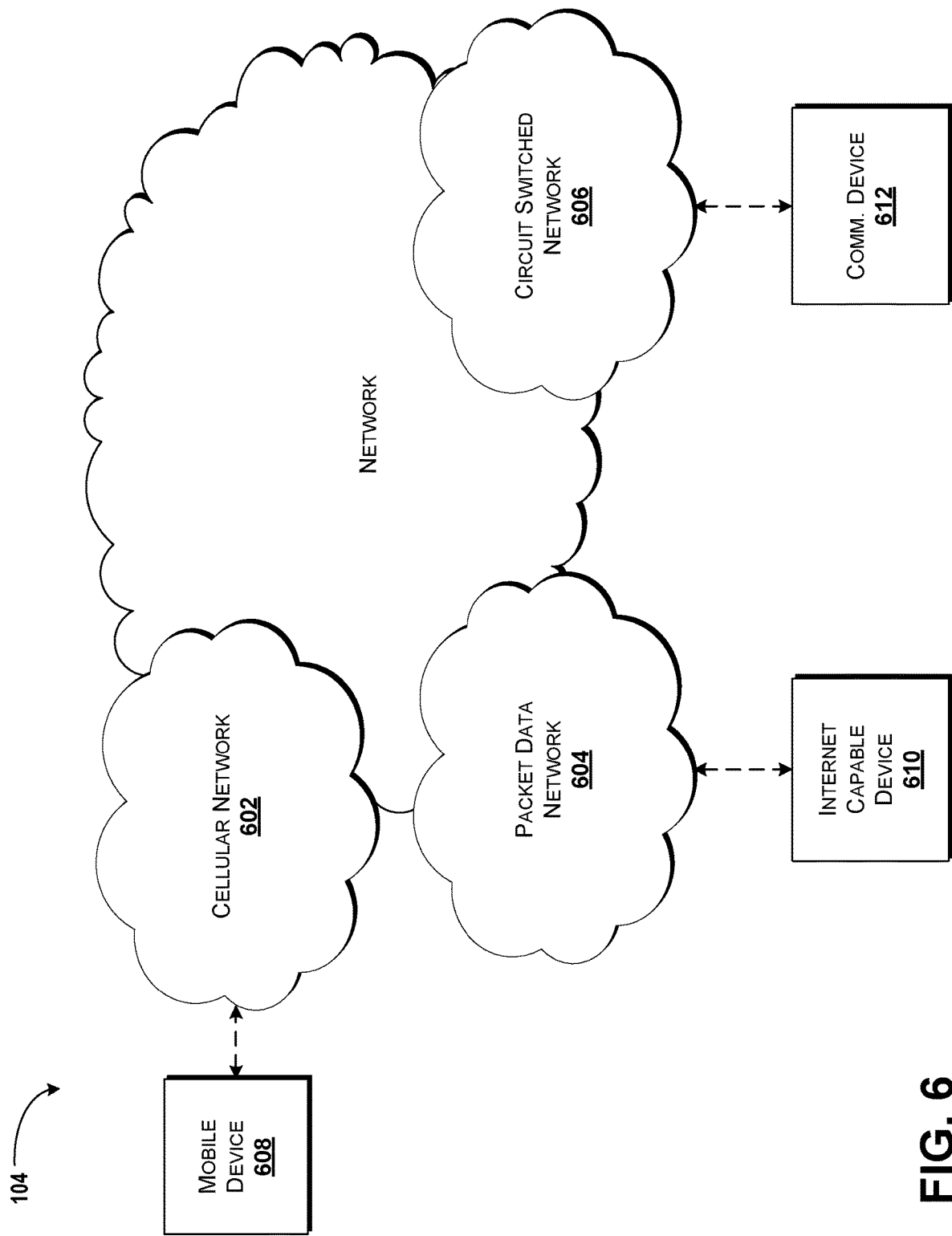
FIG. 6 schematically illustrates a network, according to an illustrative embodiment of the concepts and technologies described herein.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSDPA), and HSPA+. The cellular network 602 also is compatible with 4G mobile communications standards as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
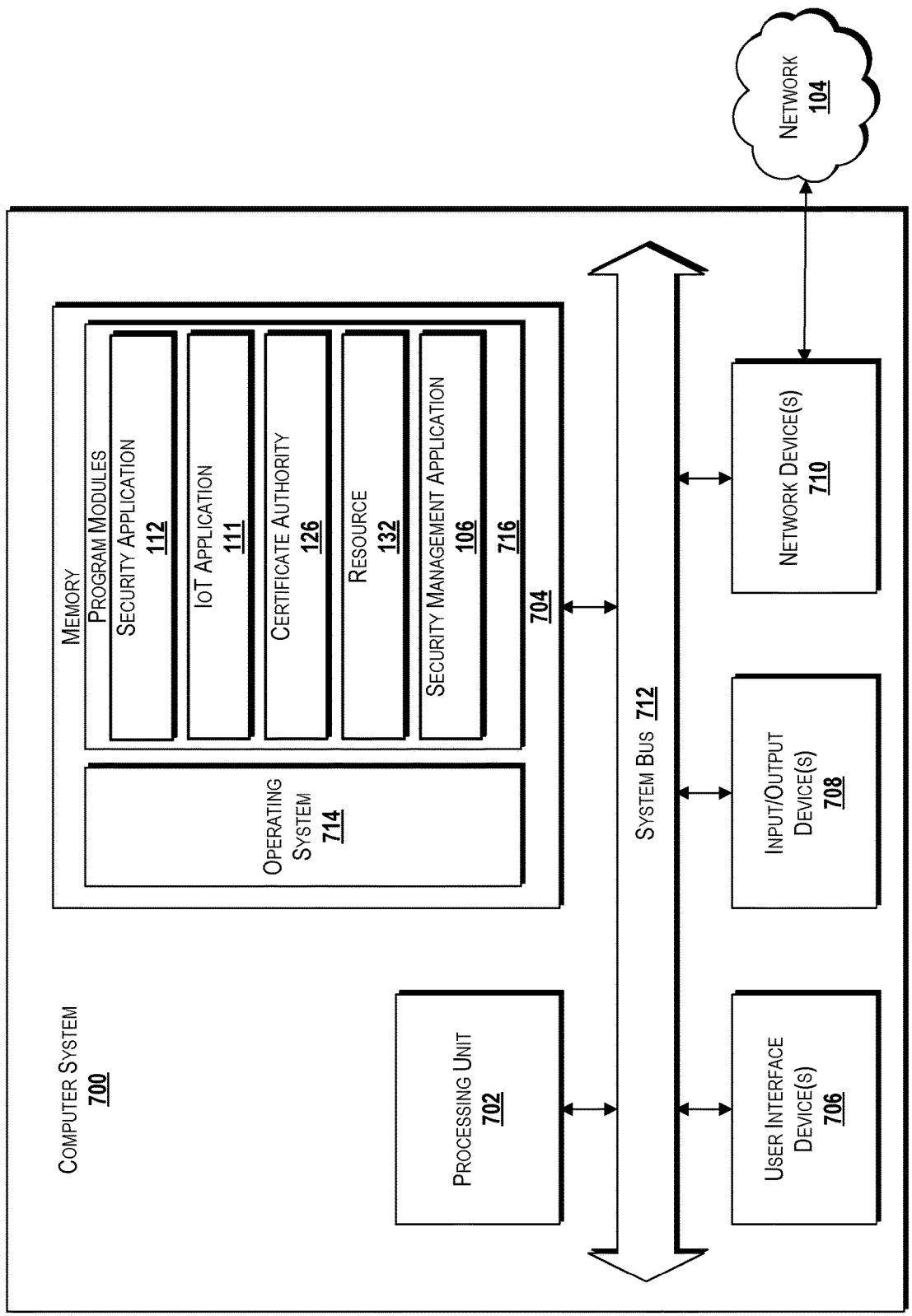
FIG. 7 is a block diagram illustrating an example computer system configured to provide and/or use multifactor authentication for IoT devices, according to some illustrative embodiments of the concepts and technologies described herein.

FIG. 7 is a block diagram illustrating a computer system 700 configured to provide the functionality described herein for providing and/or using multifactor authentication for IoT devices, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 can include the security management application 106, the IoT application 111, the security application 112, the certificate authority 126, the resource 132, and/or other applications, modules, or other entities. These and/or other programs can be embodied in computer-readable media containing instructions that, when executed by the processing unit 702, perform one or more of the methods 200, 300, 400, 500 described in detail above with respect to FIGS. 2-5 and/or other functionality as illustrated and described herein. It can be appreciated that, at least by virtue of the instructions embodying the methods 200, 300, 400, 500, and/or other functionality illustrated and described herein being stored in the memory 704 and/or accessed and/or executed by the processing unit 702, the computer system 700 is a special-purpose computing system that can facilitate providing the functionality illustrated and described herein. According to embodiments, the program modules 716 may be embodied in hardware, software, firmware, or any combination thereof. Although not shown in FIG. 7, it should be understood that the memory 704 also can be configured to store the registration request 110, the IP address data 118, the IP address request 120, the certificate 124, the additional information 130, the resource 132, the access request 136, the validation request 138, the validation communications 140, the decision 142, the API call 144, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves per se, signals per se, and/or communication media as defined herein.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
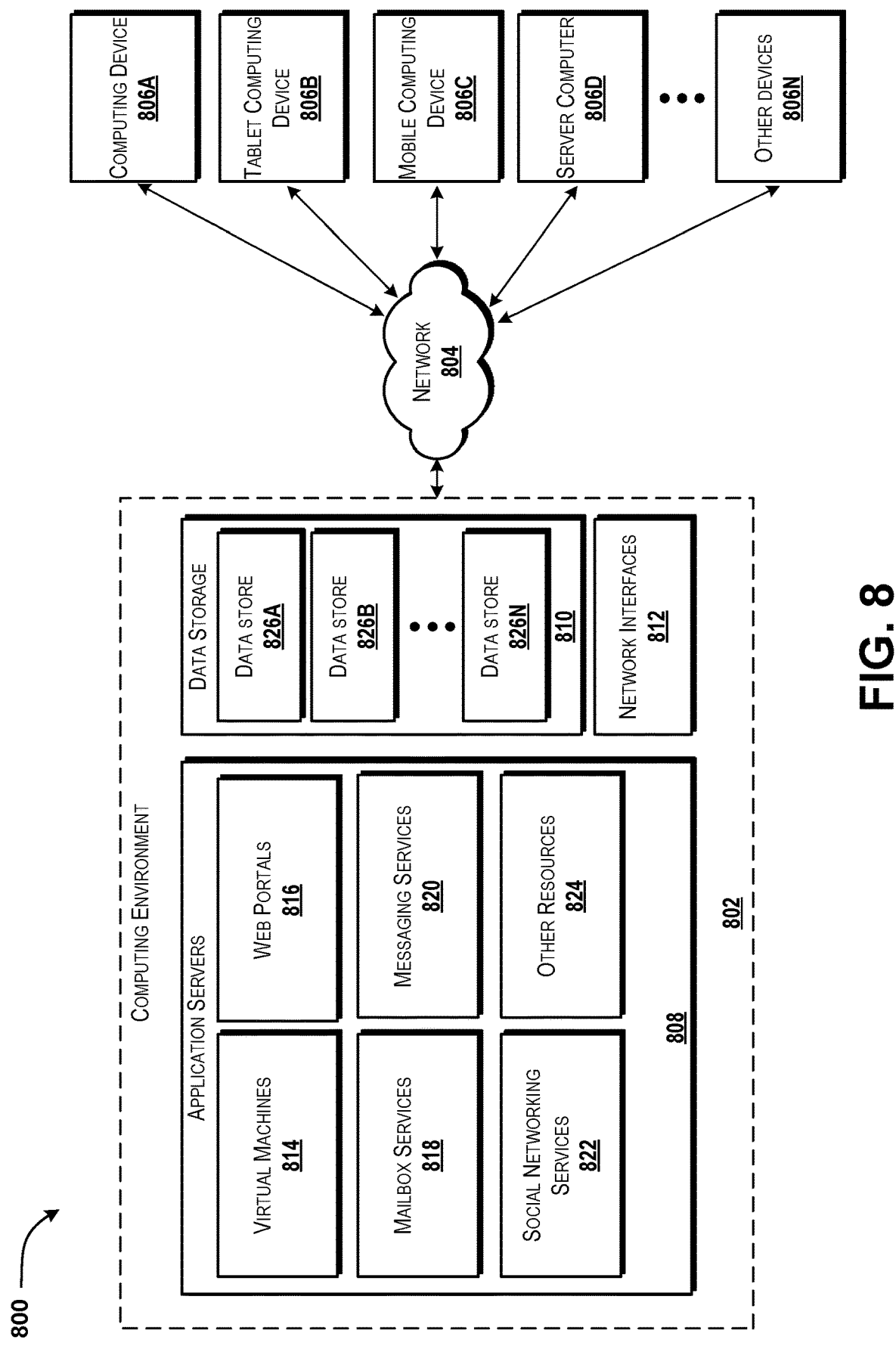
FIG. 8 is a diagram illustrating a computing environment capable of implementing aspects of the concepts and technologies disclosed herein, according to some illustrative embodiments of the concepts and technologies described herein.

FIG. 8 illustrates an illustrative distributed computing environment 800 capable of executing the software components described herein for providing and/or using multifactor authentication for IoT devices. Thus, the distributed computing environment 800 illustrated in FIG. 8 can be used to provide the functionality described herein with respect to the security management platform 102, the gateway 114, and/or the third party device 134. The distributed computing environment 800 thus may be utilized to execute any aspects of the software components presented herein.

According to various implementations, the distributed computing environment 800 includes a computing environment 802 operating on, in communication with, or as part of the network 804. The network 804 also can include various access networks. According to various embodiments of the concepts and technologies disclosed herein, the functionality of the network 804 can be provided by the network 104 and/or the OTA channel 128 illustrated in FIGS. 1 and 6-7. One or more client devices 806A-806N (hereinafter referred to collectively and/or generically as "clients 806") can communicate with the computing environment 802 via the network 804 and/or other connections (not illustrated in FIG. 8). In the illustrated embodiment, the clients 806 include a computing device 806A such as a laptop computer, a desktop computer, or other computing device; a slate or tablet computing device ("tablet computing device") 806B; a mobile computing device 806C such as a mobile telephone, a smart phone, or other mobile computing device; a server computer 806D; and/or other devices 806N. It should be understood that any number of clients 806 can communicate with the computing environment 802. A computing architecture for the clients 806 is illustrated and described herein with reference to FIG. 6. It should be understood that the illustrated clients 806 and computing architectures illustrated and described herein are illustrative, and should not be construed as being limiting in any way.

In the illustrated embodiment, the computing environment 802 can include one or more application servers 808, one or more instances of data storage 810, and one or more network interfaces 812. According to various implementations, the functionality of the application servers 808 can be provided by one or more server computers that can execute as a part of, or in communication with, the network 804. The application servers 808 can host various services, virtual machines, portals, and/or other resources. In the illustrated embodiment, the application servers 808 can host one or more virtual machines 814 for hosting applications, services, modules, or other functionality. According to various implementations, the virtual machines 814 can host one or more applications and/or software modules for providing the functionality described herein for tag-based security policy creation in a distributed computing environment. It should be understood that this embodiment is illustrative, and should not be construed as being limiting in any way. The application servers 808 also can host or can provide access to one or more Web portals, one or more link pages, one or more Web sites, and/or one or more other sources or access points to various types of information ("Web portals") 816.

According to various implementations, the application servers 808 also include one or more mailbox services 818 and one or more messaging services 820. The mailbox services 818 can include electronic mail ("email") services. The mailbox services 818 also can include various personal information management ("PIM") services including, but not limited to, calendar services, contact management services, collaboration services, and/or other services. The messaging services 820 can include, but are not limited to, instant messaging services, chat services, forum services, and/or other communication services.

The application servers 808 also can include one or more social networking services 822. The social networking services 822 can include various social networking services including, but not limited to, services for sharing or posting status updates, instant messages, links, photos, videos, and/ or other information; services for commenting or displaying interest in articles, products, blogs, or other resources; and/or other services. In some embodiments, the social networking services 822 are provided by or include the FACEBOOK social networking service, the LINKEDIN professional networking service, the MYSPACE social networking service, the FOURSQUARE geographic networking service, the YAMMER office colleague networking service, and the like. In other embodiments, the social networking services 822 are provided by other services, sites, and/or providers that may or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 822 also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/ or other services. It should be appreciated that the above lists of services are not exhaustive and that numerous additional and/or alternative social networking services 822 are not mentioned herein for the sake of brevity. As such, the above embodiments are illustrative, and should not be construed as being limiting in any way.

As shown in FIG. 8, the application servers 808 also can host other services, applications, portals, and/or other resources ("other resources") 824. The other resources 824 can include, but are not limited to, one or more operating systems, the security management application 106, the security application 112, the resource 132, and the like. It thus can be appreciated that the computing environment 802 can provide integration of the concepts and technologies disclosed herein provided herein for multifactor authentication for IoT devices with various mailbox, messaging, social networking, and/or other services or resources. For example, the concepts and technologies disclosed herein can be used to enable access to various types of resources 132 that can include access to various other resources such as messaging functionality, reporting, purchasing, other services, combinations thereof, or the like. Because the creation of messages and/or mail items is optional, it should be understood that this example is illustrative, and therefore should not be construed as being limiting in any way.

As mentioned above, the computing environment 802 can include the data storage 810. According to various implementations, the functionality of the data storage 810 is provided by one or more databases operating on, or in communication with, the network 804. The functionality of the data storage 810 also can be provided by one or more server computers configured to host data for the computing environment 802. The data storage 810 can include, host, or provide one or more real or virtual data stores 826A-826N (hereinafter referred to collectively and/or generically as "data stores 826"). The data stores 826 are configured to host data used or created by the application servers 808 and/or other data. Although not illustrated in FIG. 8, it should be understood that the data stores 826 also can host or store the various data illustrated and described herein including, but not limited to, the registration request 110, the IP address data 118, the IP address request 120, the certificate 124, the additional information 130, the resource 132, the access request 136, the validation request 138, the validation communications 140, the decision 142, the API call 144, and/or other data, and/or the like.

The computing environment 802 can communicate with, can communicate via, and/or can be accessed by, the network interfaces 812. The network interfaces 812 can include various types of network hardware and/or software (virtual and/or physical) for supporting communications between two or more computing devices including, but not limited to, the clients 806 and the application servers 808. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 provides the software functionality described herein as a service to one or more of the clients 806. It should be understood that the clients 806 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 800 to utilize the functionality described herein for providing and/or using multifactor authentication for IoT devices.

Based on the foregoing, it should be appreciated that systems and methods for multifactor authentication for IoT devices have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising a processor and a memory that stores computer-executable instructions that, when executed by the processor, cause the processor to perform operations comprising:
receiving, at a computing device that hosts a resource and from an Internet-of-things device, an access request via which the Internet-of-things device requests access to the resource, wherein the access request comprises a header comprising an IP address that is associated with the Internet-of-things device, and a certificate that is used by the Internet-of-things device to encode the access request, wherein the certificate is issued to the Internet-of-things device in response to a security management platform receiving a registration request that requests registration of the Internet-of-things device for multifactor authentication;
sending, to the security management platform, a request to validate the certificate received with the access request;
receiving, from the security management platform, a decision that indicates if the certificate is validated by the security management platform;
if the decision indicates that the certificate is validated, obtaining, from a gateway that assigned the IP address to the Internet-of-things device, a stored version of the IP address,
determining if the stored version of the IP address matches the IP address that was included in the header, and
in response to determining that the stored version of the IP address matches the IP address that was included in the header, allowing the Internet-of-things device to access the resource; and
if the decision indicates that the certificate is not validated by the security management platform, blocking the Internet-of-things device from accessing the resource.

2. The system of claim 1, wherein obtaining the stored version of the IP address comprises generating an application programming interface call that requests, from the gateway, the stored version of the IP address.

3. The system of claim 1, wherein the certificate is obtained by the Internet-of-things device via an over-the-air channel between the Internet-of-things device and a certificate authority that issues the certificate, and wherein the over-the-air channel is established to deliver updates to the Internet-of-things device.

4. The system of claim 3, wherein the certificate is issued to the Internet-of-things device by the certificate authority in response to the security management platform sending, to the certificate authority, a certificate request with the IP address of the Internet-of-things device.

5. The system of claim 3, wherein the over-the-air channel is used to obtain the certificate without establishing a new communication path.

6. The system of claim 1, wherein in response to receiving the registration request, the security management platform:
obtains, from the gateway, the IP address assigned to the Internet-of-things device; and
requests, from a certificate authority, creation of the certificate and delivery of the certificate to the Internet-of-things device.

7. A method comprising:
receiving, at a computing device that hosts a resource and from an Internet-of-things device, an access request via which the Internet-of-things device requests access to the resource, wherein the access request comprises a header comprising an IP address that is associated with the Internet-of-things device, and a certificate that is used by the Internet-of-things device to encode the access request, wherein the certificate is issued to the Internet-of-things device in response to a security management platform receiving a registration request that requests registration of the Internet-of-things device for multifactor authentication;
sending, by the computing device and to the security management platform, a request to validate the certificate received with the access request;

receiving, by the computing device and from the security management platform, a decision that indicates if the certificate is validated by the security management platform;

if the decision indicates that the certificate is validated, obtaining, by the computing device and from a gateway that assigned the IP address to the Internet-of-things device, a stored version of the IP address, determining, by the computing device, if the stored version of the IP address matches the IP address that was included in the header, and in response to determining that the stored version of the IP address matches the IP address that was included in the header, allowing, by the computing device, the Internet-of-things device to access the resource; and if the decision indicates that the certificate is not validated by the security management platform, blocking, by the computing device, the Internet-of-things device from accessing the resource.

8. The method of claim 7, wherein obtaining the stored version of the IP address comprises generating an application programming interface call that requests, from the gateway, the stored version of the IP address.

9. The method of claim 7, wherein the certificate is obtained by the Internet-of-things device from a certificate authority that issues the certificate, and wherein the certificate is obtained by the Internet-of-things device via an over-the-air channel between the Internet-of-things device and the certificate authority that issues the certificate.

10. The method of claim 9, wherein the certificate is issued to the Internet-of-things device by the certificate authority in response to the security management platform sending, to the certificate authority, a certificate request with the IP address of the Internet-of-things device.

11. The method of claim 10, wherein the multifactor authentication of the Internet-of-things device is accomplished automatically and without interaction by a user of the Internet-of-things device.

12. The method of claim 9, wherein the over-the-air channel is established to deliver updates to the Internet-of-things device.

13. The method of claim 12, wherein the over-the-air channel is used to obtain the certificate without establishing a new communication path.

14. The method of claim 7, wherein in response to receiving the registration request, the security management platform:

obtains, from the gateway, the IP address assigned to the Internet-of-things device; and requests, from a certificate authority, creation of the certificate and delivery of the certificate to the Internet-of-things device.

15. A computer storage medium having computer-executable instructions stored thereon that, when executed by a processor, cause the processor to perform operations comprising:

receiving, at a computing device that hosts a resource and from an Internet-of-things device, an access request via which the Internet-of-things device requests access to the resource, wherein the access request comprises a header comprising an IP address that is associated with the Internet-of-things device, and a certificate that is used by the Internet-of-things device to encode the access request, wherein the certificate is issued to the Internet-of-things device in response to a security management platform receiving a registration request that requests registration of the Internet-of-things device for multifactor authentication;

sending, to the security management platform, a request to validate the certificate received with the access request;

receiving, from the security management platform, a decision that indicates if the certificate is validated by the security management platform;

if the decision indicates that the certificate is validated, obtaining, from a gateway that assigned the IP address to the Internet-of-things device, a stored version of the IP address, determining if the stored version of the IP address matches the IP address that was included in the header, and in response to determining that the stored version of the IP address matches the IP address that was included in the header, allowing the Internet-of-things device to access the resource; and if the decision indicates that the certificate is not validated by the security management platform, blocking the Internet-of-things device from accessing the resource.

16. The computer storage medium of claim 15, wherein obtaining the stored version of the IP address comprises generating an application programming interface call that requests, from the gateway, the stored version of the IP address.

17. The computer storage medium of claim 15, wherein the certificate is obtained by the Internet-of-things device via an over-the-air channel between the Internet-of-things device and a certificate authority that issues the certificate the over-the-air channel is established to deliver updates to the Internet-of-things device.

18. The computer storage medium of claim 17, wherein the certificate is issued by the certificate authority to the Internet-of-things device in response to the security management platform sending, to the certificate authority, a certificate request with the IP address of the Internet-of-things device.

19. The computer storage medium of claim 17,
wherein the over-the-air channel is used to obtain the certificate without establishing a new communication path.

20. The computer storage medium of claim 15, wherein in response to receiving the registration request, the security management platform:

obtains, from the gateway, the IP address assigned to the Internet-of-things device, and requests, from a certificate authority, creation of the certificate and delivery of the certificate to the Internet-of-things device.

* * * * *